Oct. 22, 1940.    C. M. ASHLEY    2,218,596
REFRIGERATING APPARATUS
Filed July 30, 1935    4 Sheets-Sheet 1
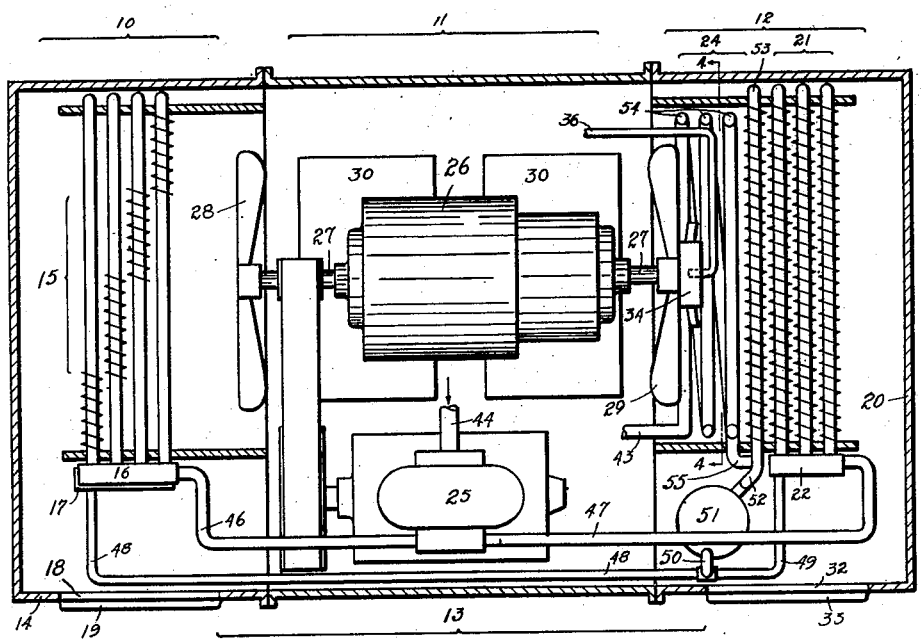
Fig-1-
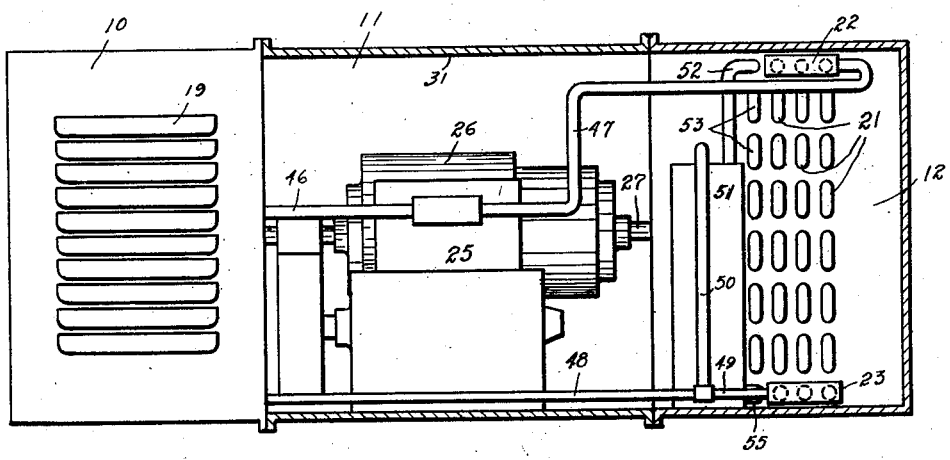
Fig-2-
INVENTOR
Carlyle M. Ashley
BY
ATTORNEY Oct. 22, 1940.   C. M. ASHLEY   2,218,596
REFRIGERATING APPARATUS
Filed July 30, 1935   4 Sheets-Sheet 2
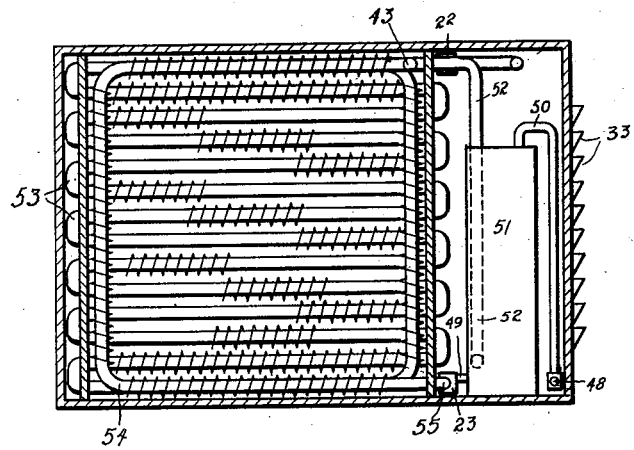
Fig-3-
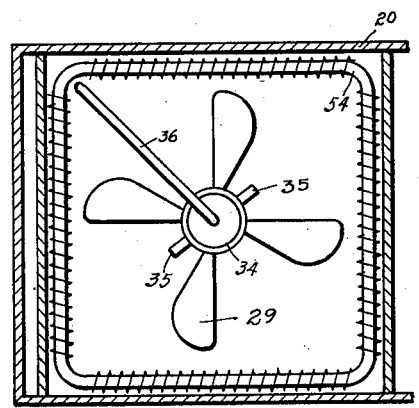
Fig-4-
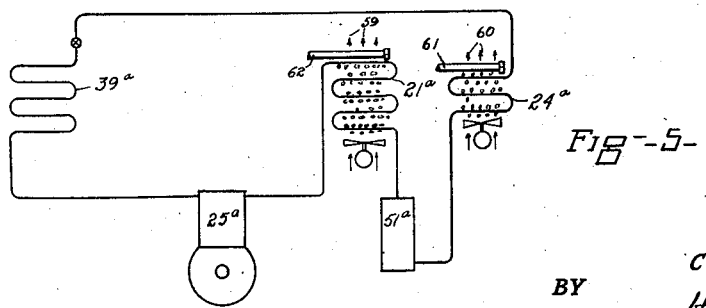
Fig-5-
INVENTOR
Carlyle M. Ashley
BY
ATTORNEY Oct. 22, 1940.   C. M. ASHLEY   2,218,596
REFRIGERATING APPARATUS
Filed July 30, 1935   4 Sheets-Sheet 3
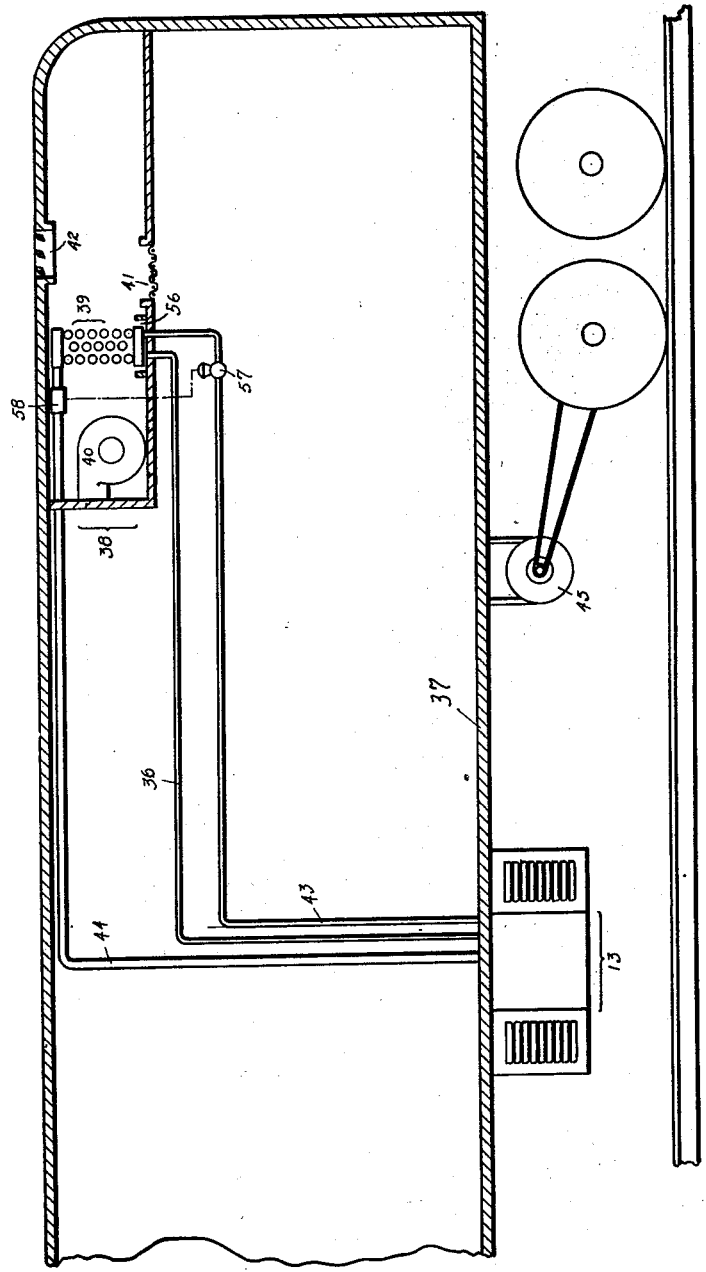
Fig-6-
INVENTOR
Carlyle M. Ashley
BY
ATTORNEY Oct. 22, 1940.  C. M. ASHLEY  2,218,596
REFRIGERATING APPARATUS
Filed July 30, 1935  4 Sheets-Sheet 4
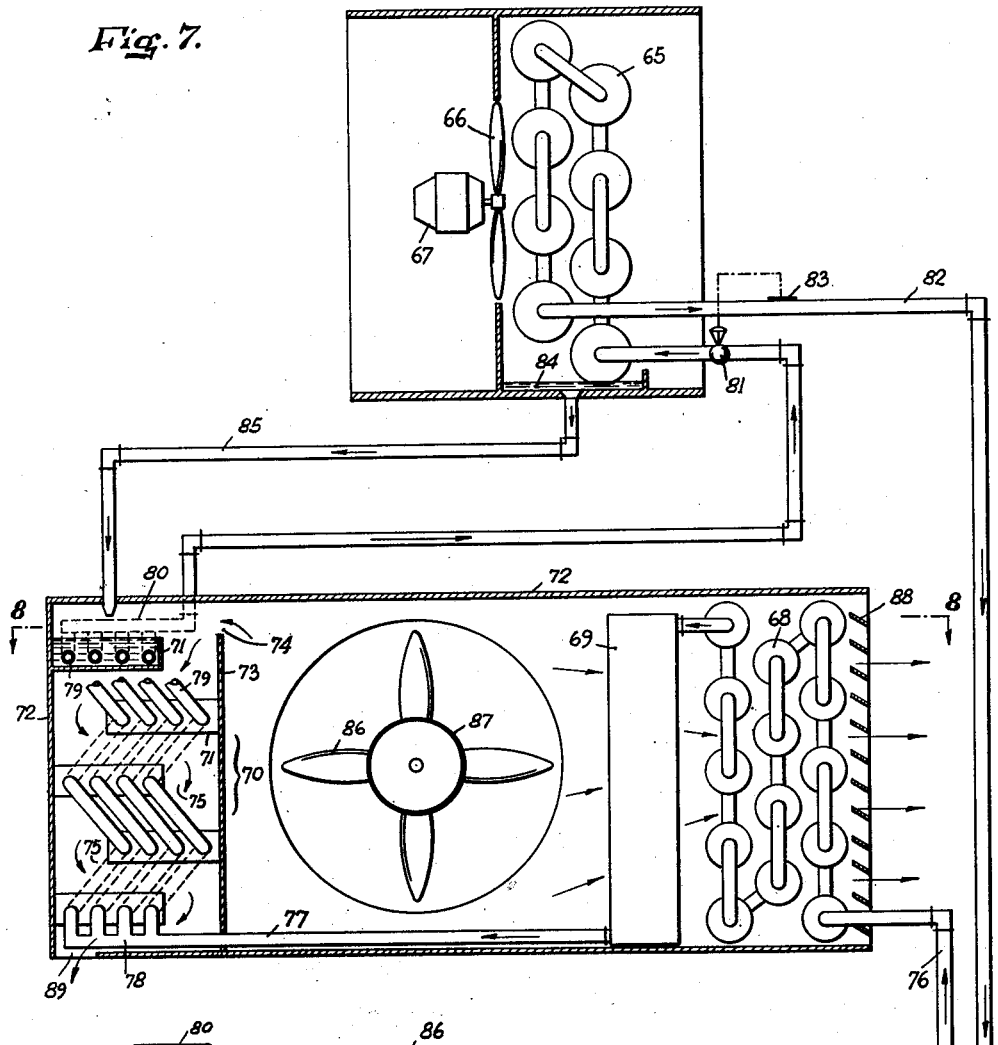
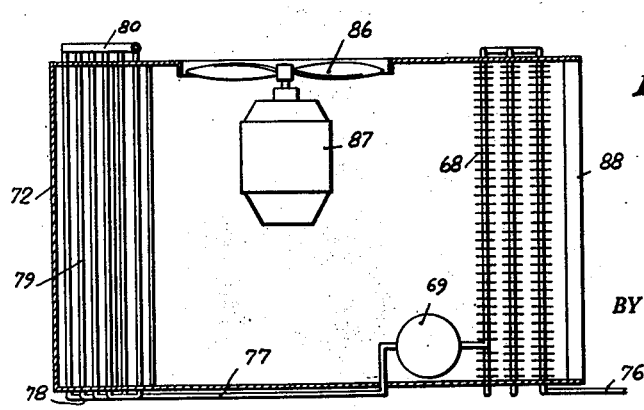
INVENTOR.
Carlyle M. Ashley,
BY
ATTORNEY.

Patented Oct. 22, 1940

2,218,596

UNITED STATES PATENT OFFICE 2,218,596

REFRIGERATING APPARATUS

Carlyle M. Ashley, Maplewood, N. J., assignor, by mesne assignments, to Carrier Corporation, Newark, N. J., a corporation of Delaware Application July 30, 1935, Serial No. 33,807

15 Claims. (Cl. 62—140)

This invention relates to refrigerating systems, and more particularly to means for increasing the efficiency of such systems.

A refrigerating system, in general, includes three essential elements, namely, an evaporator, a compressor, and a condenser. In operation, heat is abstracted from a medium in contact with the evaporator by the vaporization of a volatile refrigerant contained therein. The resulting vapor is withdrawn from the evaporator, compressed to increase its saturation temperature, and discharged within the condenser. The hot compressed vapor is liquefied by the dissipation of its heat to a medium in contact with the condenser. Briefly, heat is absorbed from one medium at a low temperature, and dissipated to another medium at a higher temperature. Either water, air, or a combination of the two may be utilized as the medium to which the heat of condensation is transferred. The refrigerant is, of course, used over and over again. In the evaporator, the liquid will be maintained at a relatively low temperature, 50 degrees F., for example, while in the condenser, the liquid temperature, under adverse conditions, may be as high as 124 degrees F. Hence, when the hot liquid from the condenser is discharged into the evaporator, it is apparent that a portion of the liquid will be vaporized to cool the remaining portion from the temperature of condensation to the temperature of evaporation. Obviously, the first mentioned portion of the refrigerant represents a total loss, no useful refrigerating work being secured. However, if the liquid is cooled below the temperature of condensation before it is admitted to the evaporator, this loss can be reduced, and consequently, the efficiency of the system can be increased. This process of cooling the liquid below its saturation temperature is termed liquid subcooling. In terms of power, this means that the brake horsepower per ton of useful refrigeration is less when the liquid subcooling is used than when it is not. In terms of refrigeration capacity, it means that a given size refrigerating system is capable of producing more useful refrigeration when subcooling is used than it can produce when subcooling is not employed. While either air, or water, may be used as a subcooling agent, applicant prefers to use a mixture of the two. Thus, the surfaces of the subcooler are wetted, and air is discharged thereover. The air evaporates a portion of the water, thus tending to cool the water to the wet bulb temperature of the incoming air, and consequently, to abstract heat from the subcooler at a temperature which is less than the dry bulb temperature of the surrounding air.

The principal object of the invention is to improve the efficiency of refrigerating systems by subcooling the refrigerant liquid prior to its admission into the evaporator.

Another object of the invention is to reduce the power requirements of a refrigerating system employing air cooled condensers.

It is another object of the invention to utilize an evaporative cooling process for removing heat from the refrigerant liquid subsequent to its discharge from the condenser and prior to its admission to the evaporator.

Still a further object of the invention is to separate the liquid from the hot, uncondensed vapors prior to the discharge of the liquid into the subcooler for the purpose of preventing the transmission of heat from the vapors to the liquid during the subcooling process.

It is a further object of the invention to provide a refrigerating system which is particularly fitted to use in connection with the cooling and air conditioning of railroad cars, or other moving vehicles, in that it is smaller in size, simpler and more effective in operation, easier to install and maintain, and is less expensive to operate than present day systems of smaller size and purpose.

A feature of the invention resides in the provision of a refrigerating system including a compressor, a condenser and a subcooler, all of which elements are mounted within a single complete unit.

Another feature of the invention resides in the subdivision of the unit into a plurality of elements whereby the assembly and installation of the unit beneath the floor of a railroad car is greatly facilitated.

A further feature of the invention resides in the provision of a refrigerating unit including a compressor, a condenser, and a liquid subcooler so arranged within the unit that a single motor may be used for driving the compressor, for operating fans for discharging air over the condenser and for distributing water over the subcooler.

Another feature of the invention resides in mounting a disk fan and a water distributing cup upon the end of the compressor motor shaft and encircling the edges of the fan with a portion of the liquid subcooler whereby the air from the fan and the water from the cup may be most effectively utilized in subcooling the refrigerant liquid.

Still another feature of the invention resides collecting water condensed from the air of the car and utilizing this water in subcooling the refrigerant liquid.

A further feature of the invention resides in mounting the condensing unit on a railroad car in such a manner that the circulation of air through the unit is not affected by the motion of the car in either direction. Other objects and features of the invention making for increased economy and efficiency both in construction and operation will in part be obvious and in part appear from the following description to be read in connection with the accompanying drawings, in which:

Fig. 1 is a plan view of a refrigerant condensing unit, the top of the casing being broken away to show the interior thereof;

Fig. 2 is an elevational view of the unit of Fig. 1, a portion of the casing being broken away to show the interior thereof;

Fig. 3 is an elevational view of one part of the unit of Fig. 1;

Fig. 4 is a sectional view taken on the line 4—4 of Fig. 1;

Fig. 5 is a diagrammatic view showing the refrigerant circuit in a refrigerating system incorporating applicant's invention;

Fig. 6 is a fragmentary view of a railroad car showing the application of the invention thereto;

Fig. 7 is a diagrammatic elevational view of another embodiment of the invention; and Fig. 8 is a plan view taken on the line 8—8 of Fig. 7.

In the drawings, similar designations referring to similar parts (Fig. 1), elements 10, 11, and 12, when assembled as shown in Fig. 1 form a condensing unit 13. The element 10 comprises a casing 14 in which is mounted a heat transfer device 15 comprising a plurality of rows of tubes zigzagged back and forth across the casing and joining at their opposite ends suitable inlet and discharge headers 16 and 17. The tubes preferably are provided with extended surface, either of the spiral fin, or any other desired type. At one side of the unit, an air outlet 18 is provided, which outlet is covered by a plurality of louvres 19. It is of note that the louvres 19 are mounted in such a way as to direct air leaving the unit upward, for a purpose hereinafter to be made clear. Element 12 comprises a casing 20 in which is mounted a heat transfer device 21 composed of a plurality of tubes which zigzag back and forth across a portion of the casing between suitable inlet and discharge headers 22 and 23 (see Figs. 2 and 3). The tubes, of course, may be provided with any suitable type of extended surface. Mounted in front of the heat transfer unit 21 is an additional heat transfer device 24 which, for convenience sake, will be denominated a subcooler. The subcooler 24 comprises a single row of tubing 53 zigzagging back and forth across the casing from the top to the bottom thereof, and a length of tubing 54 which is spiralled about the inner surface of casing 20, the two parts of the subcooler being connected by an elbow 55 (see Figs. 1, 3 and 4). An air outlet 32, covered with louvres 33, is provided in the casing 20, and is similar in all respects to the outlet 18 and louvres 19 of element 10. In the element 11, interposed between the two end elements 10 and 12, is mounted a compressor 25, driven through suitable belting (gears or chains, if desired) by a motor 26. Mounted on the opposite ends of the shaft 27 of motor 26 are two disk fans 28 and 29 which fans are adapted to draw air through air inlets 30, formed in the bottom of the casing 31, and covered with a screen (not shown), of unit 11, and to discharge this air over the heat transfer devices mounted in the elements 10 and 12 and thence through air outlets 18 and 32. A cup 34, carried by motor shaft 27 in front of fan 29, and generally concentric with the spiralled part 54 of the subcooler, is provided with a plurality of short nipples 35 extending radially therefrom. A pipe 36 is adapted to supply water to the cup from a source and for a purpose later to be described.

Considering Fig. 6, applicant shows a railroad car 37, to which this invention is particularly applicable, but in no sense limited. In the upper part of the car is mounted an air conditioning unit generally designated 38, comprising a heat transfer coil 39, hereinafter referred to as an evaporator, and a fan 40. The fan draws air either from the car through inlet 41, or from outside the car through inlet 42 (or from both) over the evaporator, and discharges it into the interior of the car through any suitable air distributing means.

The air in passing over the evaporator will, of course, give up some of its heat to the refrigerant liquid which is contained therein. Consequently, the air will be cooled and in the cooling process, a portion of its contained moisture will be condensed out. An expansion valve 57, operative responsive to a thermal unit 58, is provided for controlling the amount of refrigerant admitted to coil 40 in a well known manner. Other suitable automatic control devices may be provided for regulating the degree of dehumidification, and for controlling the temperature and humidity of air discharged by fan 40, if desired. The moisture condensed from the air is collected in pan 56 from which it is drained through pipe 36 to be used in a manner hereinafter to be made clear.

The condensing unit 13, hereinbefore described, is mounted beneath the floor of the car with its sides parallel to the sides of the car. Thus, the outlets 18 and 32 will direct air away from the unit in a direction perpendicular to the direction of motion of the car. Consequently, the direction of movement of the car cannot affect the circulation of air through the unit. Further, since louvres 19 and 33 are designed to discharge air upwardly from the unit, any tendency of the air to "short circuit," and to be again intaken through inlets 30, is effectively avoided. A pipe or liquid line 43 is provided for the purpose of conveying liquid from the condensing unit 13 to the evaporator 39 under the control of expansion valve 57, and a pipe 44 for the purpose of conveying refrigerant vapors from the evaporator 39 to the compressor. Also mounted beneath the car is an electrical generator 45 driven from the car axle in a suitable manner for the purpose of providing electrical current to operate motor 26, motor for fan 40, storage batteries, lights, and other electrical equipment on the car.

Considering now the circulation of refrigerant through the system, compressor 25 (Figs. 1 and 2) withdraws vapor from evaporator 39 (Fig. 6), compresses this vapor, and discharges the hot compressed vapor through pipes 46 and 47 to inlet headers 16 and 22 of heat transfer units 15 and 21 respectively. Air forced over the outer surfaces of these heat transfer devices by fans 28 and 29 absorbs heat from the vapors therein, thus resulting in a liquefaction of the vapors. The liquid is withdrawn from discharge headers 17 and 23 through pipes 48, 49 and 50, and collected in a liquid receiver 51. The liquid is discharged from the bottom of the receiver through pipe 52 into the top of the subcooler 24, whereby the air discharged by fan 29 may be utilized to remove a portion of the sensible heat of the liquid prior to its discharge through pipe 43 to the evaporator 39.

By collecting the hot liquid in a receiver prior to its discharge into the subcooler, it is apparent that the liquid in the subcooler may be separated from contact with the hot refrigerant gases. Thus, heating of the liquid in the subcooler by contact with the hot uncondensed vapors (as would occur if no receiver were interposed) is completely avoided.

While air alone may be utilized for removing heat from the subcooler and from the condenser, applicant prefers to use an evaporative cooling process. When air is brought into intimate contact with water, it tends to evaporate a portion of the water and in the evaporative process, the temperatures of the air and of the water are reduced. Specifically, the water tends to assume the wet bulb temperature of the incoming air. Thus, in applicant's invention, water is supplied to the cup 34 by a pipe 36 and by centrifugal action, the water is thrown outwardly through nipples 35 against the spiral part of the subcooler. The air discharged by fan 29 forces a portion of this water against the zigzag row of the subcooler, thus tending to wet it. Then, when the air contacts the wetted surfaces, a portion of the water is evaporated, thus cooling the water as described hereinbefore, and at the same time, removing heat from the refrigerant liquid contained in the subcooler. It is of importance to note that by this evaporative process the liquid may be cooled to a temperature which is below the temperature of the surrounding air. Since the removal of heat from the subcooler is secured principally by the increase of the latent heat of air passing thereover, rather than by an increase of its sensible heat, it is apparent that the temperature of the air is not materially increased, and normally, will be decreased. Hence, when the air is subsequently discharged over condenser 21, it is just as effective in removing heat from the vapors contained therein as is the dry air discharged over condenser 15. Further, by having the surfaces of the subcooler wetted, a substantially better heat transfer factor is secured, thereby still further tending to increase the efficiency of the subcooler. In practice, assuming the dry bulb temperature of the air intaken through inlets 30 were 90 degrees F., or more, it is possible with this evaporative process to secure a subcooler temperature of somewhat less than 90 degrees and a condensing temperature of 100 degrees or greater. Even under most adverse conditions, when the condensing temperature rises to 124, for example, the subcooler temperature could be kept down in the neighborhood of 90 degrees F. The efficacy of the invention is best illustrated by considering the power requirements of the compressor 25. Assuming as a first case, that no subcooler is used, that the condensing temperature is 124 degrees, and the suction temperature is 50 degrees, then the B. H. P. per ton of refrigeration will be approximately 1.35. On the other hand, when a subcooler is used to cool the liquid from the condensing temperature of 124 to 90 degrees or thereabouts, the evaporating temperature still being 50, then the B. H. P. per ton is only 1.15. If the invention is applied to a railroad car as is contemplated, this economy becomes of utmost importance. Assuming that the refrigeration requirements amounts to approximately 5 tons per car, then there is a total saving of 1.00 H. P. per car. With the first considered arrangement, the total electrical requirements, including a reserve for charging storage batteries, etc., of the car would exceed 10 kw., whereas in the latter case, the requirements would be 10 kw. or slightly less. In the first case, since standard generators are not available in capacities between 10 and 15 kw., it would be necessary to place a 15 kw. generator on the car, while in the latter case, a 10 kw. generator would suffice. Thus, there is an obvious saving both in the cost of the generator and in the weight of the equipment carried by the car. Further, the size of the storage batteries which are required for operation of the electrical equipment when the train is not in motion may be substantially reduced, the size of the power lines may be reduced, the size of refrigerant pipes 43 and 44 may be reduced, the electrical starting equipment may be of reduced capacity, and numerous other economies may be effected.

While water for the cup 34 may be drawn from any available source, a separate tank, for example, applicant avoids the necessity for such a tank by collecting the water condensed from the air by evaporator 39 in a pan 56, and supplying this water to cup 34 through pipe 36. Since the amount of water condensed from the air closely approximates the actual requirements of the subcooler, and since the source is self-limiting, the use of any valves or control devices is completely avoided, whereas if a tank were utilized, some type of shut-off valve and control valve would have to be provided. Further, the nuisance, expense and weight of carrying such a tank is completely avoided. As is apparent from the drawings, the nipples 35 sling water against the spiral part 54 of the subcooler. Simultaneously, of course, some of the water is blown against the zigzag row 53 by the current of air. However, if the water supply is limited, this particular arrangement insures the wetting of the spiralled portion 54, even though the row 53 remains dry. Thus, in effect, a counterflow arrangement is provided in that the warmest liquid (in row 53) is in contact with the warmest air, while the coldest liquid (in spiral portion 54) is in contact with water which is evaporatively cooled.

If desired, the evaporative cooling process may be omitted and air alone used for cooling both the subcooler and the condenser. In practice, it is not practicable to provide an amount of condensing surface which is in proportion to the amount of heat which must be abstracted. Thus, the temperature of condensation will be considerably higher than the temperature of air passing thereover. However, the subcooler presents a relatively large amount of surface in proportion to the amount of heat which is abstracted. Hence, the temperature of the liquid may be reduced substantially to the temperature of the incoming air. Thus, air alone can be used to cool the liquid below the temperature of condensation, and hence, the process is well worthwhile.

While in the condensing unit hereinbefore described, the subcooler has been shown as located in front of the condenser so that air from fan 29 will first pass over the subcooler, and then over the condenser, this particular arrangement may be varied as desired. One such modification is found in Fig. 5 wherein a refrigerant circuit including an evaporator 39a, compressor 25a, condenser 21a, receiver 51a and subcooler 24a, is shown diagrammatically. A header 61 discharges water from any desired source over the surfaces of the subcooler 24a for purposes hereinbefore described. Similarly, the condenser surfaces may be wetted if desired, a header 62 being provided for that purpose. Of course, either one, or both headers may be omitted, and either the condenser, or the subcooler, or both, operate with dry air. In operation, as is evident, separate streams of air, indicated by arrows 59 and 60, may be discharged over the condenser and subcooler, respectively, for the purposes of liquefying refrigerant vapors and for subcooling the resulting condensate. While two fans are shown, it is further evident that the stream of air from a single fan could be divided between the two elements 21a and 24a to accomplish the same result.

Further, it is self-evident that the condenser need not be broken into two separate elements, 15 and 21, but may be made as a single unit. Likewise, one fan driven either by motor 26, or by a separate motor, might well be utilized. However, the mounting of equipment on railroad cars is, at best, somewhat difficult. Applicant has found that by dividing the unit into three elements as herein described, the amount of space occupied by the unit is reduced, the unit as a whole is simplified, and further, the assembly and mounting of the unit is greatly facilitated.

Considering the embodiment of the invention illustrated in Figs. 7 and 8, 65 represents the evaporator, which may be mounted in the car in the same manner as evaporator 39 of Fig. 6, and 66 is a fan, driven by motor 67, which blows air over the evaporator coils. 68 is the condenser and 69 the liquid receiver. Subcooler 70 comprises a plurality of troughs 71 in stagger arrangement, extending alternately from casing 72 and from partition 73. Partition 73 extends completely across the cross-sectional area of the unit except for an air space 74 at the top of the partition. Troughs 71 extend part of the distance from the casing 72 to partition 73, the balance of the distance constituting a plurality of air passages 75. Hot refrigerant vapor is supplied through pipe 76 from a compressor (not shown) to condenser 68. Condensed refrigerant passes to liquid receiver 69 and thence, through pipe 77 to inlet header 78 of the subcooler. The liquid then passes upwardly through the subcooler through a plurality of pipes 79 positioned in the troughs, to outlet header 80. Refrigerant is admitted to the evaporator under the control of expansion valve 81, responsive to variations in temperature or pressure in suction line 82 as reflected by control element 83.

Since the amount of moisture condensed from the air which contacts the evaporator approximates the amount required to subcool the refrigerant liquid, the condensate precipitated by the evaporator is collected for this purpose, as in sump 84. The condensate is drained through pipe 85 and discharged into the highest trough 71. As the highest trough overflows, the trough next below is filled by the excess. In the same way, the lower troughs are supplied with water.

When fan 86, driven by motor 87, draws air into the casing, a pressure is built up therein. Thus, air is forced across the condenser 68 and out of the unit through louvers 88. Other air is forced through the air passages 74 and 75, passing over the water-filled troughs 71 and leaving the unit through outlet 89. Water in the troughs is evaporated, and the refrigerant liquid in pipes 79 is thus evaporatively subcooled.

Since certain changes in construction, arrangement and operation may be made in the embodiments herein shown and described without in any way departing from the scope of the invention, it is intended that the foregoing description is to be considered as illustrative and not in a limiting sense.

I claim:

1. In a refrigerating unit, a compressor, a motor for driving said compressor, a condenser, a subcooler, a water distributor mounted coaxially with respect to and on the shaft of said motor for distributing water over the outer surfaces of said subcooler, means for supplying water to said distributor and a fan mounted coaxially with respect to said distributor and driven by said shaft of said motor for discharging air over said subcooler and over said condenser.

2. In a refrigerating unit comprising a central element, and two end elements, a compressor and a driving motor therefor mounted in said central element, a condenser one portion of which is mounted in one end element and the other portion of which is mounted in the other end element, a subcooler mounted in one of said end elements, a pair of fans driven by said motor for discharging air into said end elements, and a water distributor driven by said motor for distributing water over the outer surfaces of said subcooler.

3. In a refrigerating system for a railway car, a casing which is adapted to be mounted beneath the floor of said car, a condenser mounted within said casing, an air inlet in the bottom of said casing, means for intaking air through said inlet and for discharging the air over said condenser, an air outlet in said casing, said outlet being formed in a side of the casing which is parallel to the side of the car, and louvres covering said outlet for directing the air upwardly from said casing and away from the car in a direction crosswise thereto.

4. In a refrigerating unit, a compressor, a motor for driving said compressor, a fan carried on the shaft of said motor, a condenser mounted within the air stream created by said fan, a subcooler mounted within the air stream and having a portion thereof encircling said fan, a cup carried on the end of the motor shaft, and means for supplying water to said cup whereby centrifugal force created by rotation of said cup will cause a distribution of the water over the surfaces of said subcooler.

5. In a refrigerating unit, a casing, a pair of condensing elements mounted in opposite ends of said casing, a compressor for supplying hot refrigerant vapors to both of said condensing elements, a driving motor for said compressor, said driving motor being mounted within the casing between the condensing elements, a pair of fans carried on the opposite ends of the shaft of said motor for discharging a stream of air over said condensing elements, a receiver for collecting refrigerant liquid from both of said condensing elements, a subcooler mounted in the air stream created by one of said fans, and means for discharging liquid from said receiver into said subcooler.

6. In a refrigerating unit, a casing, a pair of condensing elements mounted in opposite ends of said casing, a compressor for supplying hot refrigerant vapors to both of said condensing elements, a driving motor for said compressor, a pair of fans driven by said motor for discharging air over both of said condensing elements, a receiver for collecting refrigerant liquid from both of said condensing elements, a subcooler mounted within said casing and interposed in the air stream from one of said fans, means for discharging liquid refrigerant from said receiver into said subcooler, and means for distributing water over the surfaces of said subcooler.

7. In a refrigerating unit, a casing, a pair of condensing elements mounted in the opposite ends of said casing, a compressor for supplying hot refrigerant vapors to both of said condensing elements, a driving motor for said compressor, a pair of fans driven by said motor for discharging air over both of said condensing elements, a receiver for collecting refrigerant liquid from both of said condensing elements, a subcooler mounted within the air stream of one of said fans and having a portion thereof encircling the fan, means carried by one of said fans for distributing water over the outer surfaces of said subcooler, and means for discharging refrigerant liquid from said receiver into said subcooler.

8. The combination of a cooling tower and associated condenser, the condenser being cooled at least in part by water which is cooled in the cooling tower by evaporation of a part thereof in an air stream circulated through the tower; a surface cooler connected to receive and cool liquid condensed in said condenser, the connection being such as to inhibit the entrance of uncondensed vapor into the surface cooler, and said surface cooler being in the path of the air stream entering the cooling tower; and means for spraying makeup water into heat exchanging relation with said surface cooler and for causing unevaporated portions thereof to enter said cooling tower.

9. A refrigerating apparatus including in combination a pair of heat exchange devices arranged side by side, one of said devices comprising a refrigerant condenser and the other of said devices comprising a refrigerant subcooler, means for forcibly circulating cooling air in contact with said devices in succession, and means for spraying the surfaces of the device with which said circulated air first contacts, whereby heat may be abstracted from such last-mentioned device without appreciable increase in the dry bulb temperature of the air then circulated in contact with said other device.

10. An apparatus according to claim 9, in which the circulated air is first contacted with the subcooler before such air is contacted with said condenser.

11. An apparatus of the character described, including in combination an air cooling element adapted to precipitate moisture from air conditioned thereby, a first heat exchange device comprising a refrigerant condenser, a second heat exchange device positioned proximate the first device comprising a refrigerant subcooler, said two last-mentioned devices comprising parts of a refrigerating mechanism for maintaining said air cooling element at a relatively low temperature, means for forcibly circulating cooling air successively in contact with said different heat exchange devices, and means for spraying the heat exchange device first contacted by said circulated air with condensate precipitated by said air cooling element, whereby heat may be abstracted from such last-mentioned device without appreciable increase in the dry bulb temperature of the air then circulated in contact with said other device.

12. In a refrigerating unit comprising a central element and two end elements; a compressor and a driving motor therefor mounted in said central element, a condenser of which one portion is mounted in one end element, and of which another portion is mounted in the other end element, subcooler mounted in one of said end elements, fan means driven by said motor for discharging air over said portions of said condenser, and means actuated by said motor for distributing water over the outer surfaces of said subcooler.

13. In a refrigerating unit comprising a central element and two end elements; a compressor and a driving motor therefor mounted in said central element, a condenser of which one portion is mounted in one end element, and of which another portion is mounted in the other end element, a subcooler mounted in one of said end elements, fan means driven by said motor for discharging air over said portions of said condenser, and means for distributing water over the outer surfaces of said subcooler.

14. In a unit of the character described, an evaporator, a condenser operatively associated with said evaporator and adapted to receive refrigerant from said evaporator, a receiver adapted to receive refrigerant from the condenser, a subcooling coil adapted to receive liquid refrigerant substantially free of gas from the receiver, means for delivering liquid refrigerant from the subcooling coil to the evaporator, means for circulating air in contact with the evaporator whereby said air is cooled and moisture is precipitated therefrom, means for supplying said cooled air to an enclosure served by the unit, means for circulating air from outside said enclosure over and in heat exchange relation with said condenser and at least a portion of said subcooling coil, and means for supplying said precipitated moisture to outer surfaces of said subcooling coil.

15. In a unit of the character described, an evaporator, a condenser operatively associated with said evaporator and adapted to receive refrigerant from said evaporator, a receiver adapted to receive refrigerant from the condenser, a subcooling coil adapted to receive liquid refrigerant substantially free of gas from the receiver, means for delivering liquid refrigerant from the subcooling coil to the evaporator, means for circulating air in contact with the evaporator whereby said air is cooled and moisture is precipitated therefrom, means for supplying said cooled air to an enclosure served by the unit, means for circulating air from outside said enclosure over and in heat exchange relation with said condenser and at least a portion of said subcooling coil, means for positioning said condenser and a portion of said subcooling coil in side by side relation, and means for supplying precipitated moisture to the outer surfaces of said condenser and said last mentioned portion of cooling coil.

CARLYLE M. ASHLEY.